(12) United States Patent
Truan et al.

(10) Patent No.: US 6,422,490 B1
(45) Date of Patent: Jul. 23, 2002

(54) REAR MOUNTED SPREADER WITH HORIZONTAL AUGER

(75) Inventors: Charles J. Truan, Royal Oak; James Truan, Berkley; Joshua Scott, Royal Oak; Paul Mandrik, Harrison Township, all of MI (US)

(73) Assignee: Trynex, Inc., Warren, MI (US)

( * ) Notice: Subject to any disclaimer, the term of this patent is extended or adjusted under 35 U.S.C. 154(b) by 0 days.

(21) Appl. No.: 09/520,522

(22) Filed: Mar. 8, 2000

Related U.S. Application Data

(60) Provisional application No. 60/181,277, filed on Feb. 9, 2000, provisional application No. 60/128,342, filed on Apr. 8, 1999, and provisional application No. 60/123,663, filed on Mar. 9, 1999.

(51) Int. Cl.[7] ............................................... A01C 15/00

(52) U.S. Cl. .................... 239/659; 239/67; 239/663; 239/672; 239/677; 239/683; 239/675; 239/684

(58) Field of Search ........................... 239/67, 672, 675, 239/659, 661, 663, 681, 687, 684, 676, 677, 683; 222/196; 366/108, 131, 132, 133

(56) References Cited

U.S. PATENT DOCUMENTS

| | | | | |
|---|---|---|---|---|
| 2,858,011 A | * | 10/1958 | Wahl | 222/413 |
| 3,322,429 A | * | 5/1967 | Cervelli | 239/677 X |
| 3,559,894 A | * | 2/1971 | Murray | 239/675 X |
| 4,363,447 A | * | 12/1982 | Schulze | 239/659 |
| 4,712,717 A | * | 12/1987 | Egerdahl | 239/663 X |
| H1205 H | * | 7/1993 | Pearce et al. | 239/654 |
| 5,234,128 A | * | 8/1993 | Hill | 239/650 X |
| 5,288,028 A | * | 2/1994 | Spivak et al. | 239/683 |
| 5,649,666 A | * | 7/1997 | Lewis | 239/675 X |
| 5,927,617 A | * | 7/1999 | Musso, Jr. et al. | 239/676 X |
| 6,027,052 A | * | 2/2000 | Strieker et al. | 239/659 X |
| 6,047,908 A | * | 4/2000 | Seymour et al. | 239/675 |
| 6,068,200 A | * | 5/2000 | Kime | 239/684 X |
| 6,145,709 A | * | 11/2000 | Hogan et al. | 222/278 |

* cited by examiner

Primary Examiner—Steven J. Ganey
(74) Attorney, Agent, or Firm—Howard & Howard

(57) ABSTRACT

A rear mounted spreader having a horizontal auger. The spreader is ideally suited to spread bulk salt and sand, but can effectively be used to spread any spreadable material. The spreader is mounted to a vehicle and the auger is generally perpendicular to the longitudinal axis of the vehicle. The spreader includes a flow plate to facilitate proper material flow. The spreader also includes a vehicle-mounted control that can independently control the auger and spinner and can control the vibrator.

31 Claims, 8 Drawing Sheets

REAR MOUNTED SPREADER WITH HORIZONTAL AUGER

This application claims priority to provisional application Nos. 60/123,663, 60/128,342 and 60/181,277 filed on Mar. 9, 1999, Apr. 8, 1999 and Feb. 9, 2000, respectively.

BACKGROUND OF THE INVENTION

The general invention relates to spreaders, and more particularly to an improved auger design using a motor and transmission to drive a horizontal auger and a separate motor to drive a spinner. Even more particularly, the present invention is directed to an economical, compact spreader having a horizontal auger that is adapted to be mounted upon the rear of a vehicle, such as for example a pick-up truck and to spread salt, sand and other materials.

Conventional rear mounted spreaders have a material delivery system which uses a vertical auger for directing material through an outlet in a hopper. The outlet is typically a circular opening formed by the converging walls of the hopper. Generally, a tubular opening is defined by the walls adjacent to the circular opening and the auger is received within this tubular opening. The blades of the auger are closely adjacent to the walls of this tubular opening. The hopper receives and stores, for example, sand, salt or other materials to be spread. The vertical auger typically rises from the outlet and into the hopper. In conventional spreaders, a rod extends from the auger and attaches to a motor mounted in the hopper that drives the auger.

This type of vertical auger orientation has presented operating problems. Due to moisture or other environmental factors, the material within the hopper can become compacted, particularly adjacent the tubular opening. While the auger effectively directs material contacting the auger through the outlet, the compacted material can cause a cavity to form above the auger preventing material from reaching the auger. Compaction is particularly problematic with sand and bulk salt, which naturally compacts and cavitates in a spreader. Sand and bulk salt will form a cavity directly above the auger and starve the auger.

SUMMARY OF THE INVENTION

The present invention overcomes the above problems found in known spreaders and provides many advantages.

The spreader unit of the present invention includes a hopper for holding material to be spread. The hopper includes an opening for receipt of material and an outlet for discharging material. A spinner is mounted to a vertical drive shaft, which is driven by a motor that is controlled from within the vehicle. The spinner receives material from the outlet and throws the material over a large distribution area. The spinner and spinner motor are mounted outside the hopper for easy maintenance and to protect the motor from the corrosive material inside the hopper.

The spreader unit further includes a horizontal auger along the bottom of the hopper to direct material toward the outlet for facilitating the discharge of material from the hopper through the outlet. Preferably, a right angle drive transmission is connected to a separate drive motor, which is connected to the auger for driving the auger. The motor and right angle drive transmission are mounted outside of the hopper to facilitate maintenance and reduce corrosion. In the preferred embodiment, a separate control controls the motor driving the auger. In this way, the auger speed and the spinner speed can be independently set and controlled.

In a further embodiment of the present invention, the drive mechanism includes a dual speed transmission. In this way, the transmission can be designed to drive the auger at one speed and the spinner at a second speed.

The horizontal auger significantly reduces the potential for a cavity forming around the auger due to the opening above the auger being much larger. Instead of a relatively small tubular opening surrounding the auger, there is a long shallow area containing the auger. With the greater area of the opening above the auger, cavitation is greatly reduced because the bottom of the sand or salt continually falls into the opening. The compacted material loses its own support. With the addition of a vibrator assembly, the problem of cavitation is eliminated.

In this way, bulk salt and sand can be spread from a rear mounted spreader. Prior to the present invention, rear mounted spreaders were limited to spreading bagged salt, which doesn't have the same compaction problems as bulk salt and sand.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
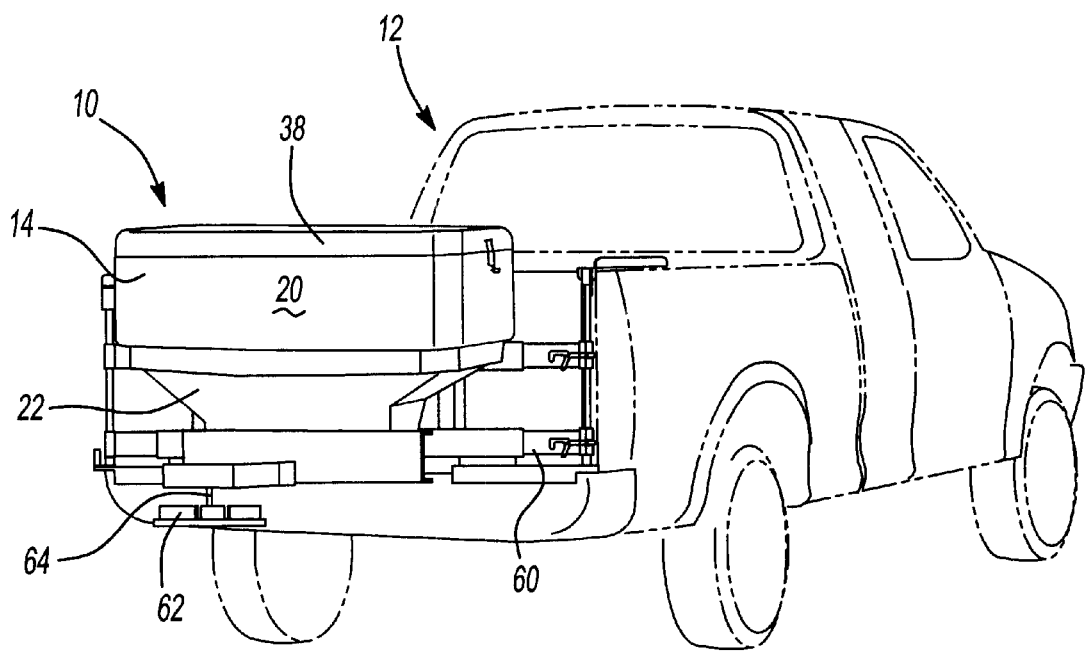
FIG. 1 is a rear perspective view of a pick-up truck having the spreader assembly of the present invention mounted to the rear.

The spreader assembly of the present invention is shown generally at 10 in FIG. 1. The assembly 10 is ideally suited for spreading salt or sand and can also be used for spreading other spreadable materials such as seed, fertilizer, etc. As illustrated, the assembly 10 is mounted to a vehicle 12, such as, for example, the rear of a pick-up. The assembly 10 includes a hopper 14 for holding material to be spread having an opening 16 for receipt of material and an outlet 18 for discharging material. See FIG. 2. The hopper 14 includes an upper portion 20 and a lower portion 22. The upper portion 20 is substantially rectangular for holding material.

The lower portion 22 includes a forward wall 24, a rear wall 26 and first and second side walls 28,30, all angled toward outlet 18. The assembly includes a hopper top 38 for closing the opening 16 of the hopper 14. The top 38 includes two latches on opposed sides for affixing the top 38 to the hopper 14.

The hopper 14 is mounted to a main spreader frame generally shown at 40 having an upper beam 42 and a lower beam 44. The upper beam 42 includes a first and a second upper side member 46,48 and a rear upper member 50. The lower beam 44 includes a rear lower member 52 and motor support beams 54 and 56. The hopper 14 includes a support surface 58 for supporting the hopper 14 upon the side members 46,48 and rear upper member 50. The main spreader frame 40 is mounted to a vehicle mounting frame 60, see FIG. 1, which pivots with respect to the rear of a pick-up truck so that the hopper 14 can be pivoted to allow the tail gate of the pick-up truck to be opened and closed without having to remove the assembly 10.

The assembly includes a spinner 62 mounted to a vertical drive shaft 64 for receiving material from the outlet 18 and for throwing material over a large distribution area. In the preferred embodiment, the spinner 62 is driven by a motor and transmission assembly 63, which are mounted outside the hopper 14. A cover 65 is used to protect the motor and transmission 63 from the elements. The motor and transmission 63 and cover 65 are mounted to the support 54, preferably by bolts for easy removal and maintenance.

A horizontal auger 66 extends toward the outlet 18 for facilitating the discharge of material from the hopper 14 through the outlet 18. The auger 66 is oriented such that a first end 68 extends through an aperture 69 in the first apex side wall 34 and attaches to a bearing 70 connected to the support 54 of the lower beam 44. See FIGS. 1 and 3. A second end 72 of auger 66 protrudes through an aperture 74 in the second apex side wall 36 and into right angle drive mechanism 76. The drive mechanism 76 is connected to the auger 66 for driving the auger 66. The drive mechanism 76 is controlled by controller 101 illustrated in FIG. 5. The drive mechanism 76 includes a motor 77 and right angle drive 79 both mounted outside the hopper to the side member 48 by bolts. A cover 67 is mounted over the drive mechanism 76 to protect the drive 76 from the elements.

The lower portion 22 of the hopper 14 directs material toward the auger 66 and the auger 66 pushes material toward the outlet 18. A baffle 78 covers the outlet 18 and the second end 72 of the auger 66 for preventing material from freely flowing through the outlet 18. The baffle 78 is affixed to the side wall 28 of the lower portion 22 of the hopper 14.

Figure 2:
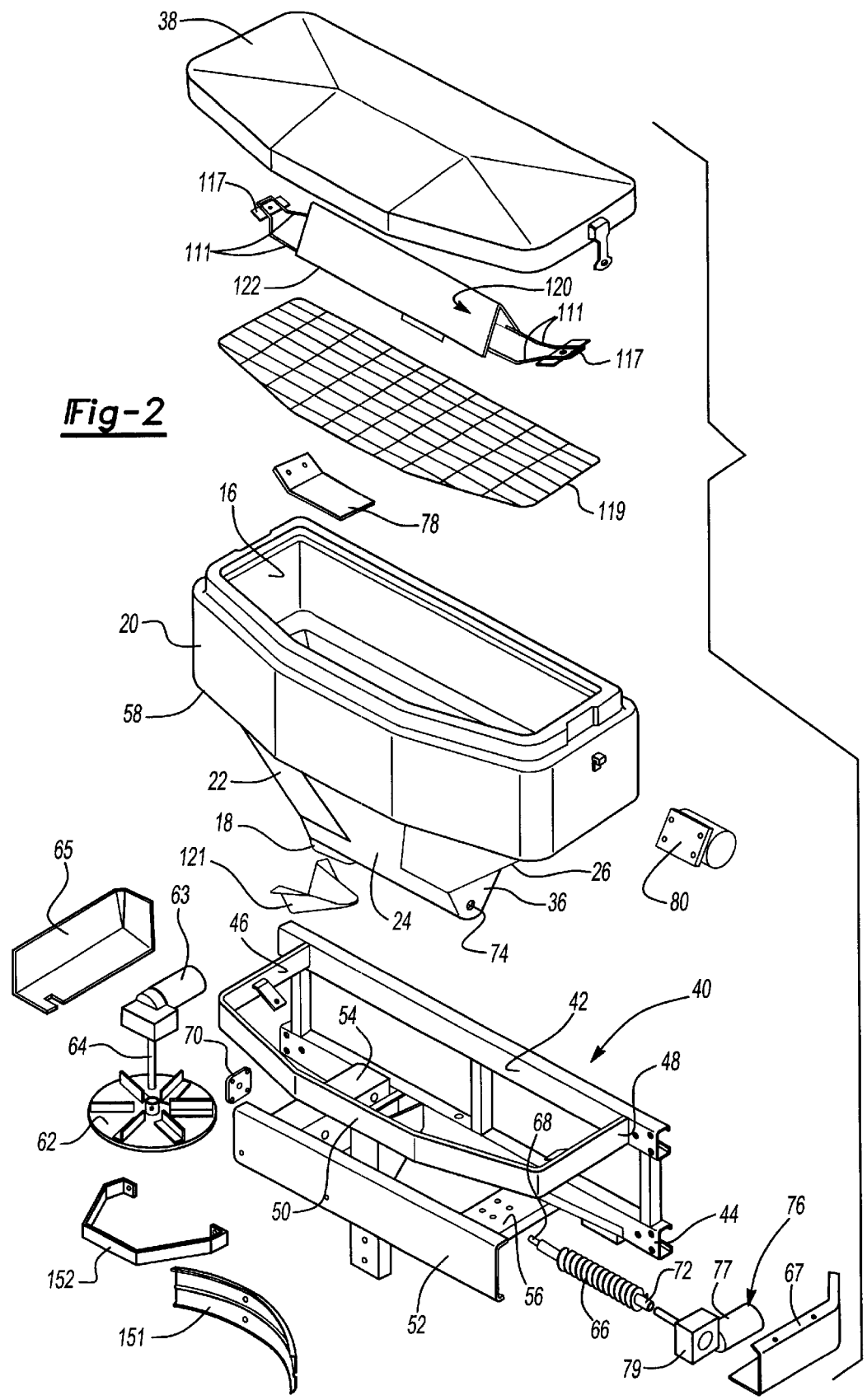
FIG. 2 is an exploded view of the spreader of the present invention.
Figure 3:
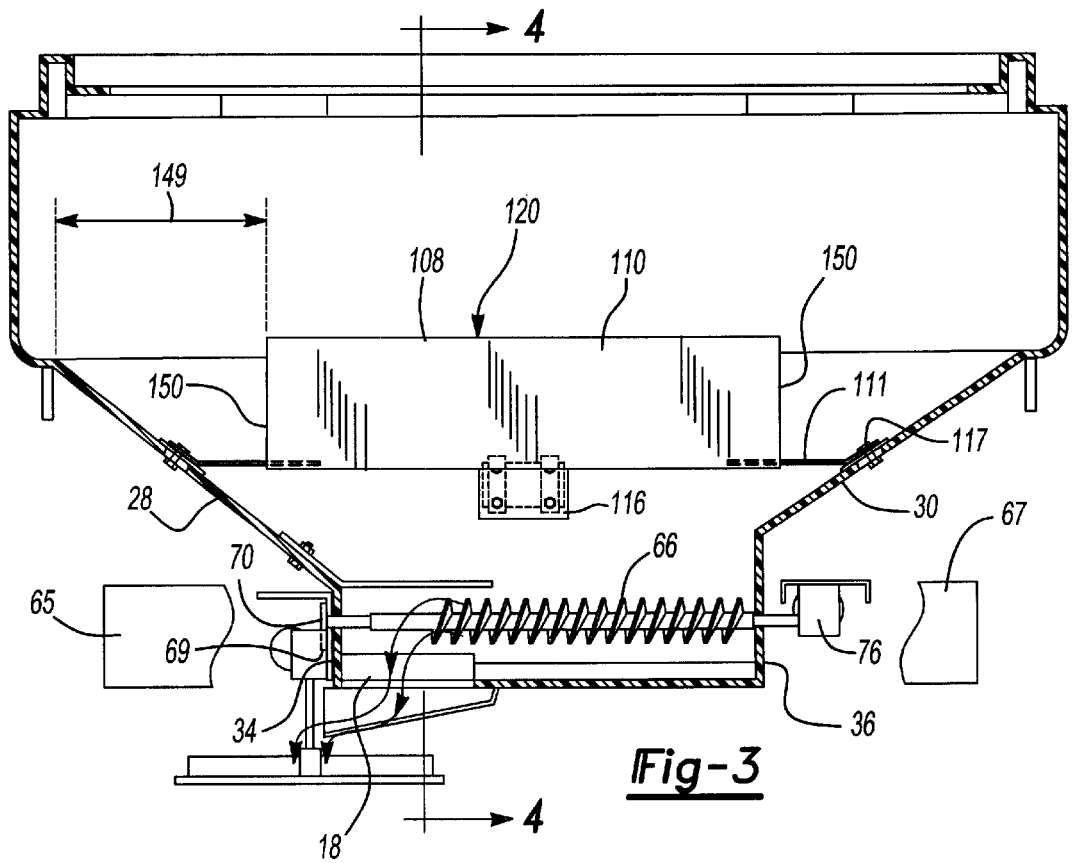
FIG. 3 cross section view of the spreader assembly of the present invention.
Figure 4:
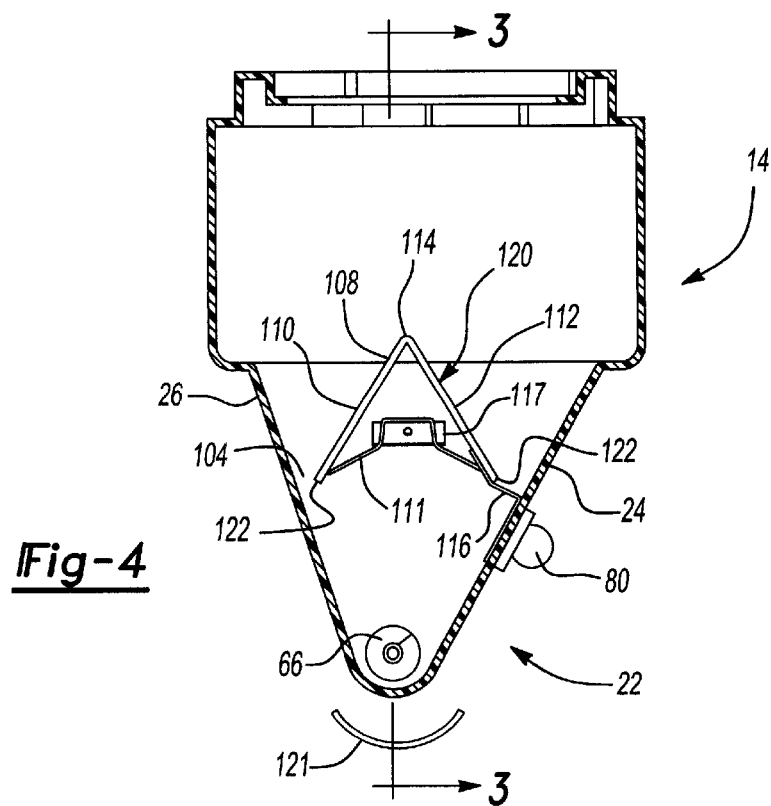
FIG. 4 is a cutaway view taken along line 4—4 of FIG. 3.
Figure 6:
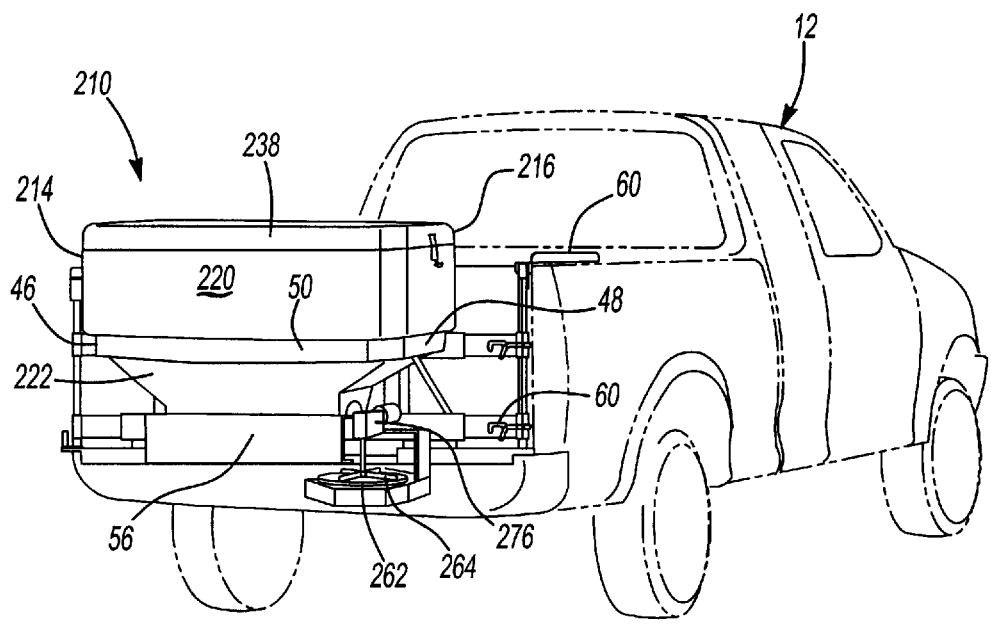
FIG. 6 is a rear perspective view of a pick-up truck having the spreader assembly of the present invention mounted to the rear.
Figure 7:
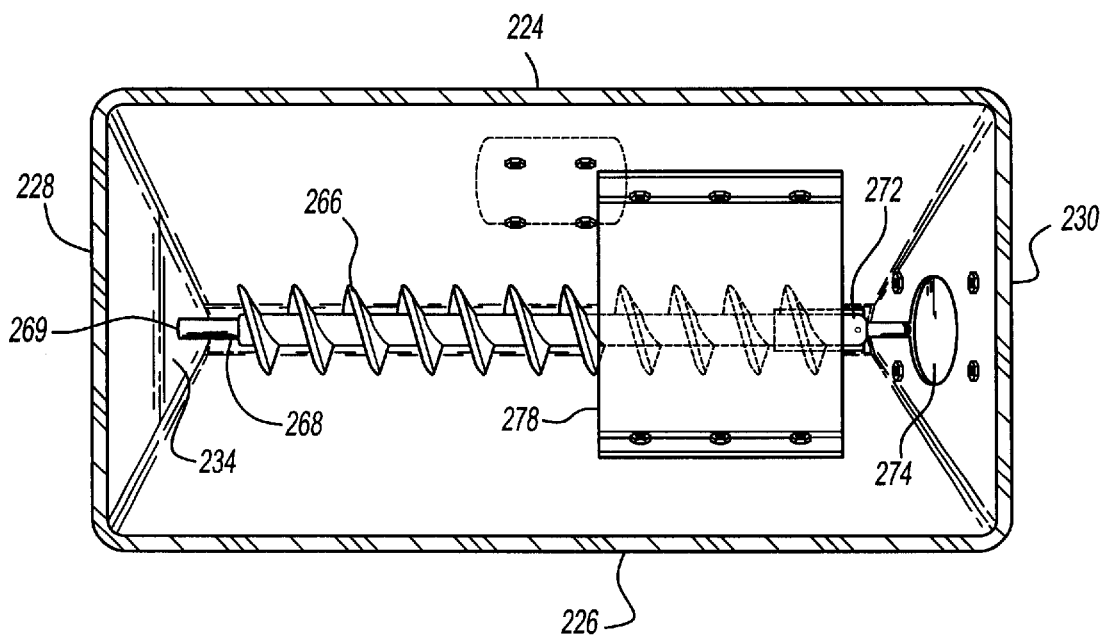
FIG. 7 is a top view of the inside of the hopper showing the horizontal auger.
Figure 8:
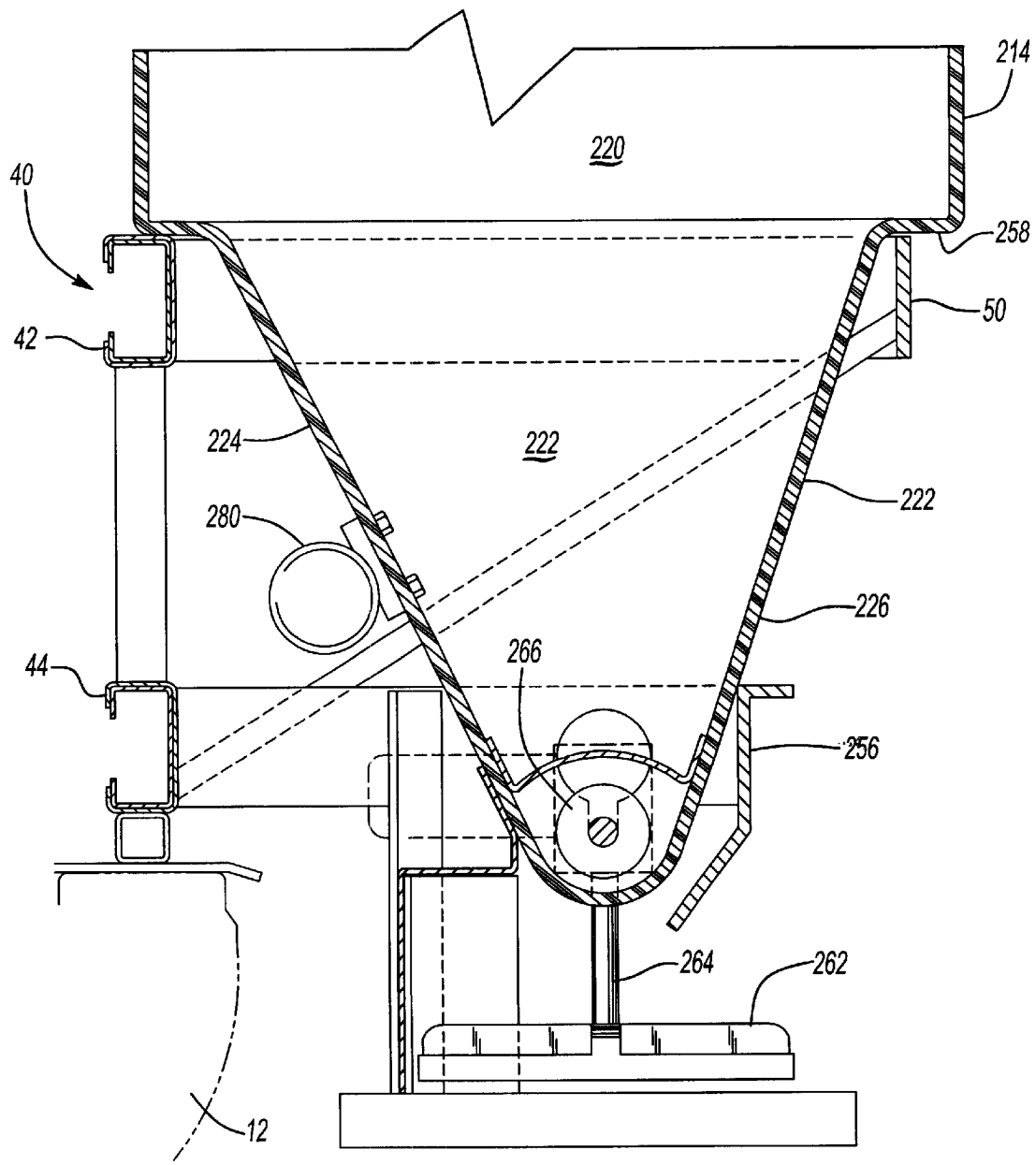
FIG. 8 is a side cross section of the spreader assembly of the present invention.
Figure 9:
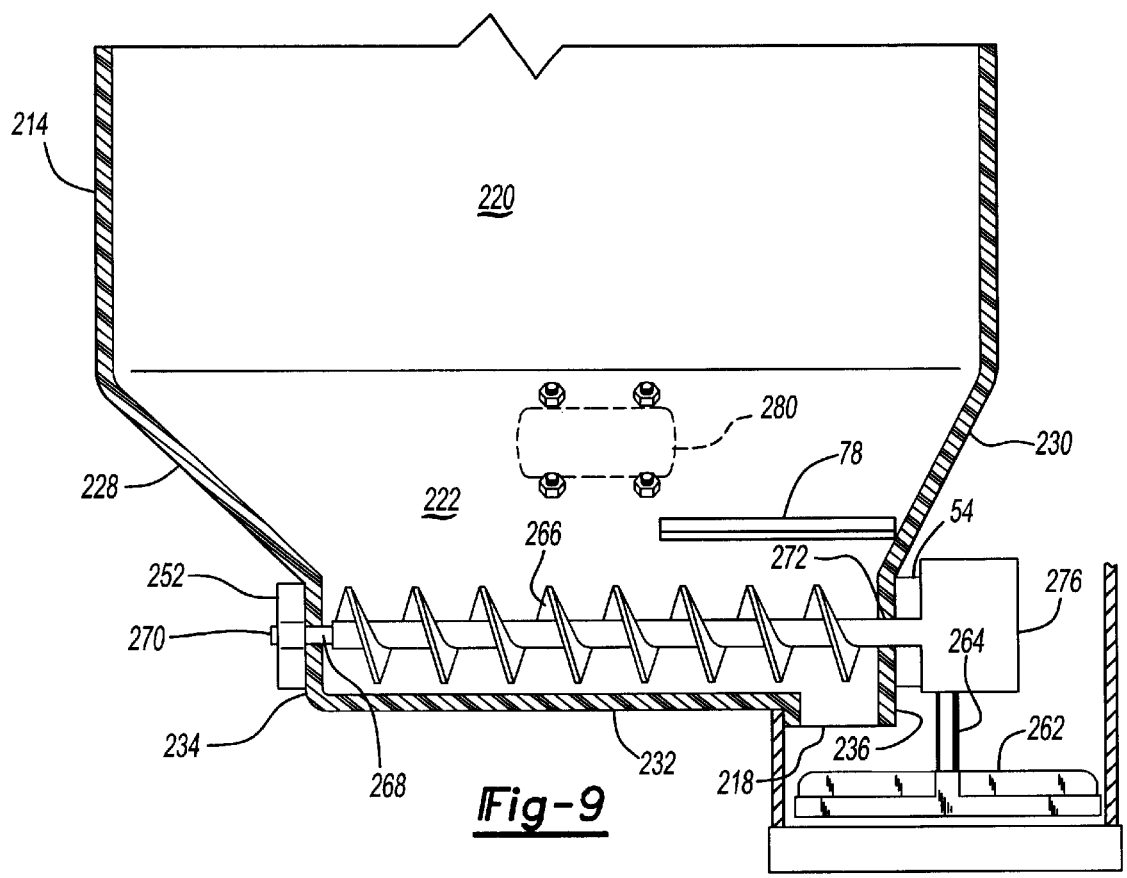
FIG. 9 is a rear cross section view of the spreader assembly of the present invention.
Figure 10:
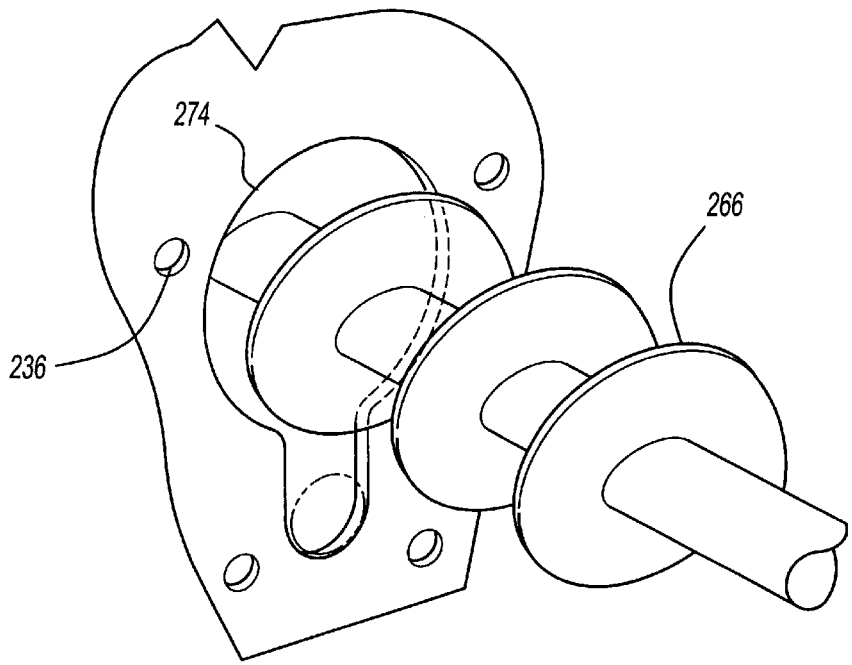
FIG. 10 is perspective view of the auger of the present invention being inserted through the keyhole shaped aperture in the side of the hopper.

In the embodiment illustrated at FIGS. 2 through 4, a flow facilitator assembly shown generally at 120 is mounted adjacent to the horizontal auger 66 to facilitate the flow of material to auger 66. The facilitator 120 facilitates the flow of material in several ways. In the first way, facilitator 120 restricts the flow of material from within the hopper to the area immediately adjacent to the auger 66. The restrictor 120 functions like a shield to control the amount of material that reaches the auger 66. The material is supported on the top of the flow facilitator 120 and flows around the edges 122 of the facilitator 120 through the gap 104 between the walls 24 and 26 of the lower portion 22 of the hopper 14. A further way is that the facilitator 120 relieves weight upon the auger 66. This allows the auger 66 to begin to rotate without having to rotate under the weight of the material in the hopper 14. A still further advantage is that the facilitator 120 allows the material on the auger to "burp" or heave upward when the auger 66 starts to rotate. This relieves some of the weight on the auger 66 allowing it to begin operation with less power and reducing the potential for auger 66 to lock up. Another way is that facilitator 120 vibrates to agitate the material within the hopper so that it continues to flow around the edges 122 of the facilitator 120 to the auger 66. The facilitator 120 functions as a chisel with the vibrator to cut through the material.

As illustrated, facilitator 120 has a generally V-shaped plate 108, which is formed from side members 110 and 112. In the preferred embodiment, the plates are at about a 45° angle with respect to one another and the gap 104 is about 5¾ inches between edge 122 and sidewalls 24 or 26. The side members 110 and 112 in the preferred embodiment are about 5¼ inches wide and 26 inches long. The plate 108 generally defines a knife edge 114 and edges 122. A mounting bracket 116 interconnects the plate 108 to the wall 24 of the hopper 14. A vibrator 80 is operatively connected to the bracket 116 to create vibrations within the V-shaped plate 108 to facilitate material flow. In the preferred embodiment, connecting rods 111 and mounting brackets 117 connect the plate 108 to the side walls 28 and 30. The rods 111 allow material to be distributed to easily flow down to the bottom of the hopper without clogging the auger 66 or the opening 18. The distance from auger 66 to edge 114 is preferably about 11 inches and the distance between the ends 150 of side members 110 and 112 are about 11 inches from the farthest most point of sides 28 and 30 generally located at 149. A screen 119 is also used to screen out larger materials to prevent clogging or the spreader 10. A discharge chute 121 is provided to efficiently deliver material to the spinner 62. A shield 151 prevents material from being discharged against the vehicle 12. Guard 152 is used to protect spinner 62.

Figure 5:
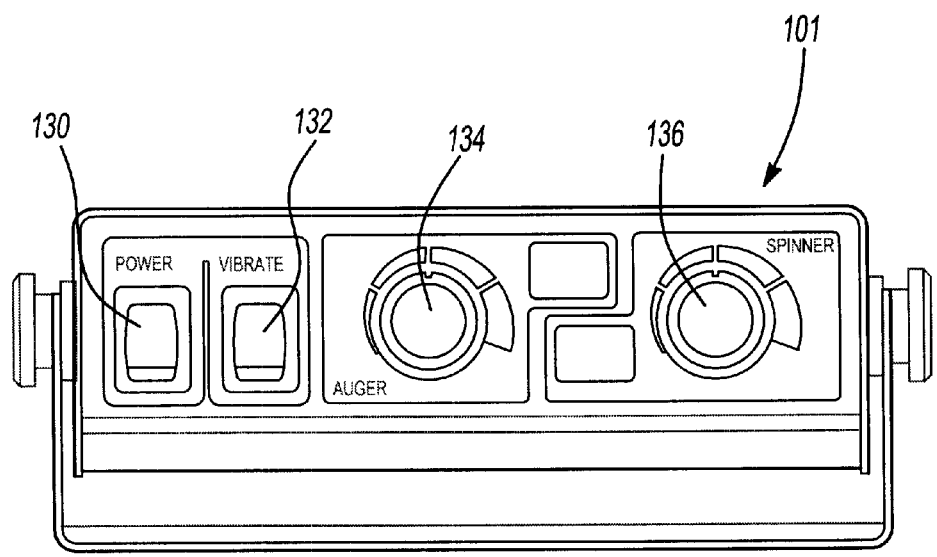
FIG. 5 is a plan view of the control unit of the present invention.

With reference to FIG. 5, the control 101 of the present invention is illustrated. The control 101 has a power switch 130 and a vibrate switch 132. The power switch 130 provides power to the motors 63 and 76. Speed controls 134 and 136 control the speed of the auger 66 and the spinner 62 respectively. The vibrate switch 132 controls the vibrator 80. In the preferred embodiment, the controller 101 is mounted in the cab of the vehicle 12. As will be appreciated, the controller 101 allows the auger 66 and the spinner 62 to be controlled separately. In the preferred embodiment, the controller 101 includes a surge feature that automatically surges the auger 66 to its full power for a predetermined period of time to break up the material in the hopper in the event that the material is compacted. This surging continues a preset number of times or until the compacted material is released, whichever occurs first.

With reference to FIGS. 6 through 12, a further embodiment of the present invention is illustrated. The spreader assembly of this embodiment is shown generally at 210 in FIG. 6. The assembly 210 is ideally suited for spreading salt and sand and can also be used for spreading other spreadable materials such as seed, fertilizer, etc. As illustrated, the assembly 210 is mounted to a vehicle 12, such as, for example, the rear of a pick-up. The assembly 210 includes a hopper 214 for holding material to be spread having an opening 216 for receipt of material and an outlet 218 for discharging material. The hopper 214 includes an upper portion 220 and a lower portion 222. The upper portion 220 is substantially cubical for holding material. The lower portion 222 includes a forward wall 224, a rear wall 226 and first and second sidewalls 228, 230, all angled toward a downward pointing apex for forcing the material toward the apex. The apex forms an oblong section 232 having a first apex sidewall 234 and a second apex sidewall 236. The outlet 218 is located substantially near the second apex sidewall 236. The assembly includes a hopper top 238 for enclosing the hopper. The top 238 includes two latches on opposed sides for affixing the top 238 to the hopper 214.

As with the previous embodiment, the assembly 210 of the present invention is mounted to the rear of a vehicle by a spreader frame. The hopper 214 is mounted to a main spreader frame generally shown at 40 having an upper beam 42 and a lower beam 44. The upper beam 42 includes a first and a second upper side member 46,48 and a rear upper member 50. Likewise, the lower beam 44 includes a first and a second side lower member 52,54 and a rear lower member 56. The hopper 214 includes a support surface 258 for supporting the hopper 214 upon the upper beam 42. The main spreader frame 40 is mounted to a vehicle mounting frame 60 which pivots with respect to the rear of a pick-up truck so that the hopper 214 can be pivoted to allow the tail gate of the pick-up truck to be opened and closed without having to remove the assembly 210.

The assembly includes a spinner 262 mounted to a vertical drive shaft 264 for receiving material from the outlet 218 and for throwing material over a large distribution area.

A horizontal auger 266 extends toward the outlet 218 for facilitating the discharge of material from the hopper 214 through the outlet 218. The auger 266 is oriented such that a first end 268 extends through an aperture 269 in the first apex side wall 234 and attaches to a bearing 270 located in the first side member 252 of the lower beam 44. A second end 272 protrudes both through a key hole shaped aperture 274 in the second apex side wall 236 and through the second side member 54 of the lower beam 44 and into a dual speed right angle drive mechanism 276.

The keyhole shaped aperture 274 allows the auger 266 to be installed through the second apex sidewall 236 both enhancing assembly operations and easing repair and maintenance efforts. The drive mechanism 276 is connected to the drive shaft 264 for driving the spinner 262 and to the auger 266 for driving the auger 266. The drive mechanism 276 includes a transmission operating at a dual speed. For example, the ratio between the spinner 262 speed and the auger 266 speed can be set at 7:1.

The lower portion 222 of the hopper 214 directs material toward the auger 266 and the auger 266 pushes material toward the outlet 218. A sheet of material 278 covers the outlet 218 and the second end 272 of the auger 266 for preventing material from freely flowing through the outlet 218. The sheet 278 is affixed to the forward and rear walls 224,226 of the lower portion 222 of the hopper 214. A vibrator 280 is attached to the forward wall 224 of the hopper 214 for loosening compacted material and for facilitating flow of material toward the auger 266.

Figure 11:
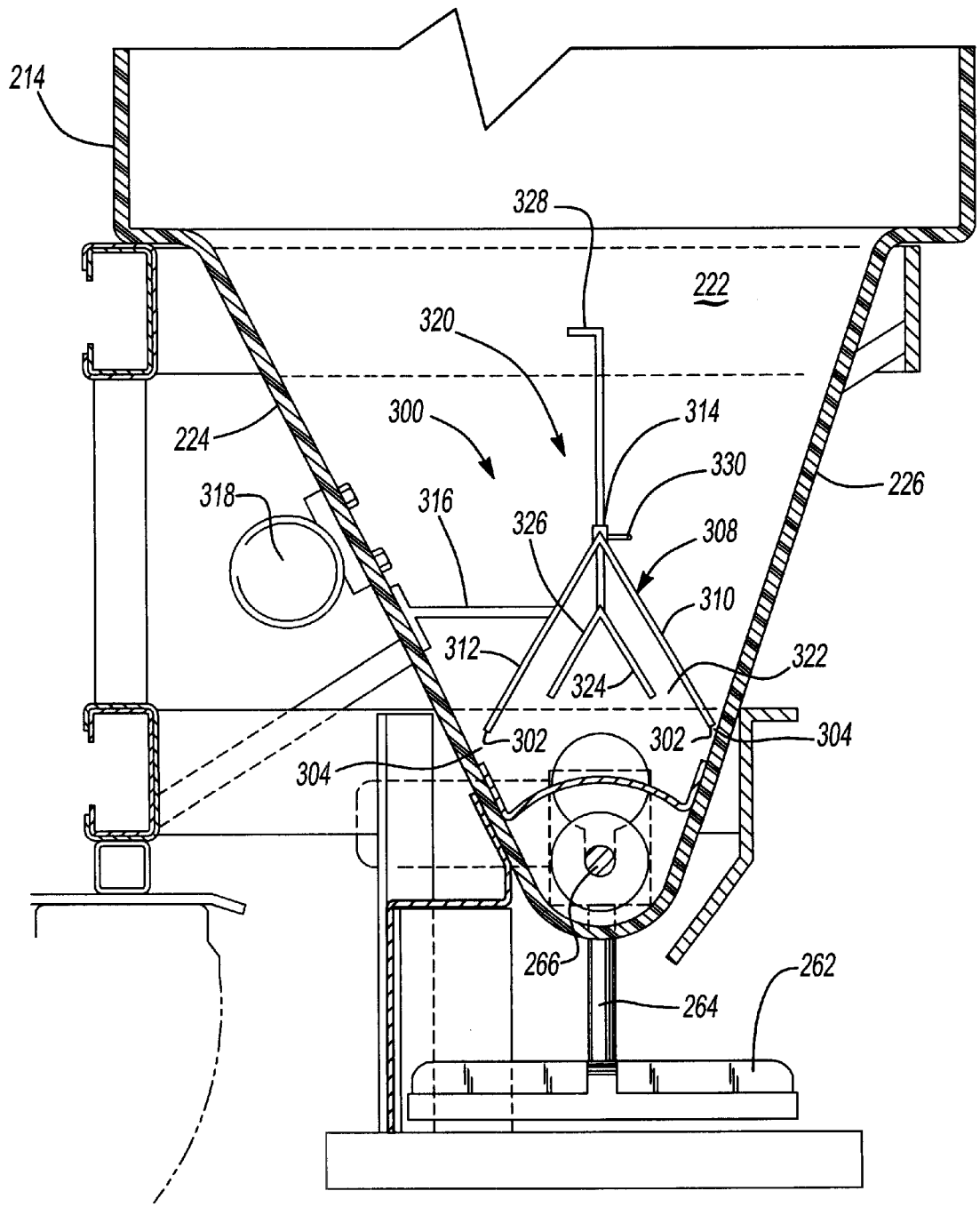
FIG. 11 is a side cross-sectional view of a further embodiment of the spreader assembly of the present invention.
Figure 12:
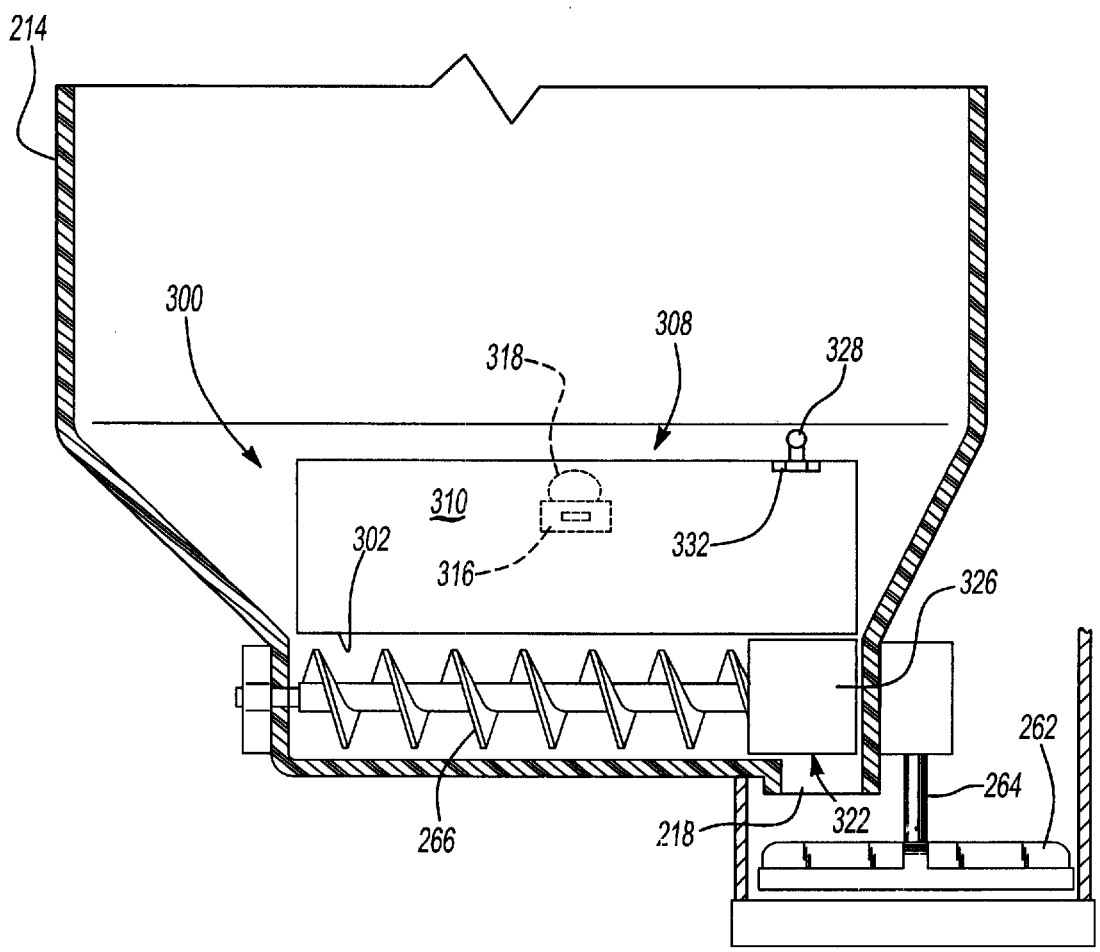
FIG. 12 is a rear cross-section view of the embodiment of FIG. 11.

In the embodiment illustrated at FIGS. 11 and 12, a flow facilitator assembly shown generally at 300 is mounted adjacent to the horizontal auger 266 to facilitate the flow of material to auger 266. The facilitator 300 facilitates the flow of material in two ways. In the first way, facilitator 300 restricts the flow of material from within the hopper to the area immediately adjacent to the auger 266. The restrictor 300 functions like a shield to control the amount of material that reaches the auger 266. The material is supported on the top of the flow facilitator 300 and flows around the edges 302 of the facilitator 300 through the gap 304 between the walls 224 and 226 of the lower portion 222 of the hopper 214. The other way is that the facilitator 300 vibrates to agitate the material within the hopper so that it continues to flow around the edges 302 of the facilitator 300 to the auger 266.

As illustrated, facilitator 300 has a generally V-shaped plate 308, which is formed from side members 310 and 312. The plate 308 generally defines a knife-edge 314 and edges 302. A mounting bracket 316 interconnects the plate 308 to the wall 224 of the hopper 214. A vibrator 318 is operatively connected to the bracket 316 to create vibrations within the V-shaped plate 308 to facilitate material flow.

Due to the fact that the present hopper is intended to distribute bulk sand and bulk salt, a flow restrictor 320 is also provided. It has been found by applicant that bulk salt must be restricted at the outlet 218 or it will freely flow out of the hopper. In order to overcome this problem in the present embodiment, applicant has provided a flow restrictor 320. Restrictor 320 includes a small plate 322 which, in the preferred embodiment, is V-shaped having sides 324 and 326. A rod 328 extends from the top of plate 322 and has a stop 330 to allow the restrictor 322 to be raised with respect to the auger and held in the raised position or lowered to the restricting position as shown in FIG. 12. The stop 330 can be any known method of holding the rod 328 with respect to the facilitator 300. For example, it could be a notch in the rod, a spring-loaded mechanism which when pressed, releases the restrictor, etc. The top of the facilitator 300 has an opening 332, which receives rod 328 to allow the restrictor 322 to be raised and lowered with respect to the outlet 218. When the restrictor 322 is dropped down over the auger, it is directly above the auger outlet 218 and restricts the flow of material preventing the material from flowing directly out of the outlet 218. With restrictor 322 in the down position, material within the hopper 214 must be augured to the outlet for discharge as opposed to falling freely from the outlet. This restrictor 322 is important when bulk salt is being spread because of the consistency of bulk salt, the salt flows freely and without restrictor 322, the salt will pour out of the outlet.

The invention has been described in an illustrative manner, and it is to be understood that the terminology, which has been used, is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A spreader assembly for spreading material, said assembly comprising:
   a hopper for holding material to be spread, said hopper having an opening for receipt of material and an outlet for discharging material;
   a spinner mounted to a vertical drive shaft for receiving material from said outlet and for throwing material over a large distribution area;
   a horizontal auger extending toward said outlet for facilitating the discharge of material from said hopper through said outlet;
   a drive mechanism connected to said spinner for driving said spinner and connected to said auger for driving said auger;
   a flow facilitator connected to said hopper and positioned within said hopper adjacent said horizontal auger for directing flow of material to said auger;
   a vibrator connected to said flow facilitator for vibrating said flow facilitator; and
   a control for controlling said drive mechanism.

2. The spreader assembly of claim 1, wherein said hopper has front and back walls and first and second side walls, said first and second side walls are angled inwardly in the direction of said outlet.

3. The spreader assembly of claim 2, wherein said horizontal auger extends between said sidewalls.

4. The spreader assembly of claim 2, wherein said first side wall is adjacent said outlet and said first side wall angle with respect to vertical is less than the angle with respect to vertical of said second wall.

5. The spreader assembly of claim 2, wherein said horizontal auger includes blades, said blades terminating a spaced distance from said first sidewall.

6. The spreader assembly of claim 1, wherein said hopper is adapted to be mounted to a vehicle, said vehicle having a longitudinal axis, said hopper having a longitudinal axis said hopper longitudinal axis being generally perpendicular to said vehicle longitudinal axis when said hopper is in use.

7. The spreader assembly of claim 1, further including a baffle partially covering said outlet.

8. The spreader assembly of claim 1, wherein said drive mechanism includes first and second right angle drives, one for said spinner and one for said auger.

9. The spreader assembly of claim 1, wherein said control provides an initial power surge to said auger to begin movement of said auger.

10. The spreader assembly of claim 9, wherein said control provides repetitive power surges to virtually rotate said auger.

11. The spreader assembly of claim 1, further comprising a transmission connected to said right angle drive mechanism to drive said spinner and said auger at different speeds.

12. The spreader assembly of claim 1, wherein said flow facilitator is further defined as a plate.

13. The spreader assembly of claim 12, wherein said plate has first and second sides forming an apex with said sides extending outwardly at an angle from said apex.

14. The spreader assembly of claim 12, further including a bracket operatively connected to said vibrator and said plate.

15. The spreader assembly of claim 14, further including connecting rods interconnecting said plate to said hopper.

16. The spreader assembly of claim 12, wherein said hopper is defined by sidewalls and a bottom; said plate is spaced from said side walls and said bottom.

17. The spreader assembly of claim 16, wherein said plate includes mounting brackets extending from said plate to said sidewalls.

18. The spreader assembly of claim 1, wherein said drive mechanism is further defined as a right angle drive mechanism for driving said auger and a motor for driving said spinner.

19. A spreader assembly for spreading material, said assembly comprising:
- a hopper for holding material to be spread, said hopper having an opening for receipt of material and an outlet for discharging material;
- a spinner mounted to a vertical drive shaft for receiving material from said outlet and for throwing material over a large distribution area;
- an auger positioned within said hopper horizontally disposed adjacent said outlet for facilitating the discharge of material from said hopper through said outlet;
- a facilitator assembly operatively connected to said hopper for facilitating the discharge of material from said hopper through said outlet;
- a vibrator connected to said facilitator assembly for vibrating said facilitator assembly;
- a first drive mechanism connected to said spinner for driving said spinner;
- a second drive mechanism connected to said auger for driving said auger; and
- a controller for independently controlling said first drive mechanism, said second drive mechanism, and said vibrator.

20. The spreader assembly of claim 19, wherein said facilitator assembly comprises a plate having first and second sides forming a knife-edged apex with said sides extending outwardly at an angle from said apex.

21. The spreader assembly of claim 20, wherein said hopper has front and back walls and first and second side walls, said first and second side walls are angled inwardly in the direction of said outlet.

22. The spreader assembly of claim 19 further including a baffle partially covering said outlet.

23. The spreader assembly of claim 19, wherein said control provides an initial power surge to said auger to begin movement of said auger.

24. The spreader assembly of claim 23, wherein said control provides repetitive power surges to rotate said auger.

25. The spreader assembly of claim 19 wherein said hopper is adapted to be mounted to a vehicle, said vehicle having a longitudinal axis, said hopper having a longitudinal axis said hopper longitudinal axis being generally perpendicular to said vehicle longitudinal axis when said hopper is in use.

26. A spreader assembly for spreading material, said assembly comprising:
- a hopper for holding material to be spread, said hopper having an opening for receipt of material and an outlet for discharging material;
- a powered spinner mounted to a vertical drive shaft for receiving material from said outlet and for throwing material over a large distribution area;
- a powered horizontal auger extending toward said outlet for facilitating the discharge of material from said hopper through said outlet;
- a flow facilitator connected to said hopper and positioned within said hopper adjacent said horizontal auger for directing flow of material to said auger;
- a vibrator connected to said flow facilitator for vibrating said flow facilitator; and
- a control for controlling said powered spinner and said powered horizontal auger.

27. The spreader assembly of claim 26, wherein said flow facilitator is further defined as a plate.

28. The spreader assembly of claim 27, wherein said plate has first and second sides forming an apex with said sides extending outwardly at an angle from said apex.

29. The spreader assembly of claim 28, wherein said plate has first and second sides forming an apex with said sides extending outwardly at an angle from said apex.

30. The spreader assembly of claim 26, wherein said powered spinner further includes a motor and a transmission assembly connected to said powered spinner for driving said powered spinner.

31. The spreader assembly of claim 26, wherein said powered auger further includes a motor and a drive mechanism connected to said powered auger for driving said powered auger.

* * * * *